(12) United States Patent
Chin et al.

(10) Patent No.: US 7,145,127 B2
(45) Date of Patent: Dec. 5, 2006

(54) OPTICAL ENCODING THAT UTILIZES TOTAL INTERNAL REFLECTION

(75) Inventors: Yee Loong Chin, Perak (MY); Siang Leong Foo, Penang (MY); Chee Keong Chong, Pulau Pingang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 133 days.

(21) Appl. No.: 10/926,243

(22) Filed: Aug. 25, 2004

(65) Prior Publication Data

US 2006/0043271 A1    Mar. 2, 2006

(51) Int. Cl.
*G01D 5/34* (2006.01)
*H01J 3/14* (2006.01)
*H03M 1/22* (2006.01)

(52) U.S. Cl. .................. 250/231.13; 250/231.14; 250/216; 341/11

(58) Field of Classification Search ........... 250/216, 250/231.13, 231.14, 231.16, 231.17, 231.18, 250/237 G, 237 R; 356/614, 616, 617; 341/11, 341/13, 31
See application file for complete search history.

(56) References Cited

U.S. PATENT DOCUMENTS

| 4,451,731 | A | 5/1984 | Leonard |
| 4,691,101 | A | 9/1987 | Leonard |
| 5,241,172 | A | 8/1993 | Lugaresi |
| 6,278,107 | B1 * | 8/2001 | Gaumet ................. 250/231.13 |
| 6,995,356 | B1 * | 2/2006 | Chong et al. .......... 250/231.14 |

* cited by examiner

*Primary Examiner*—Georgia Epps
*Assistant Examiner*—Don Williams (57) ABSTRACT

A coding element such as a codewheel includes first and second surfaces that are configured with respect to each other and with respect to a light beam such that the light beam is reflected at the two surfaces using the optical phenomenon of total internal reflection. The coding element also includes a coding pattern that is aligned in an optical path of the light beam after the light beam has reflected off of both of the surfaces. A coding element with surfaces that reflect a light beam as a result of total internal reflection can be utilized in an encoding system that operates in transmission while the light source and the photodetector array are located on the same side of the coding element.

19 Claims, 6 Drawing Sheets

OPTICAL ENCODING THAT UTILIZES TOTAL INTERNAL REFLECTION

BACKGROUND OF THE INVENTION

Optical encoders are used to monitor the motion of, for example, a shaft such as a crank shaft. Optical encoders can monitor the motion of a shaft in terms of position and/or number of revolutions of the shaft. They typically use a codewheel attached to the shaft to modulate light as the shaft and the codewheel rotate. The light is modulated as it passes through a track on the codewheel that includes a pattern of transparent and opaque sections. As the light is modulated in response to the rotation of the codewheel, a stream of electrical signals is generated from a photodetector array that receives the modulated light. The electrical signals are used to determine the position and/or number of revolutions of the shaft.

Figure 1A:
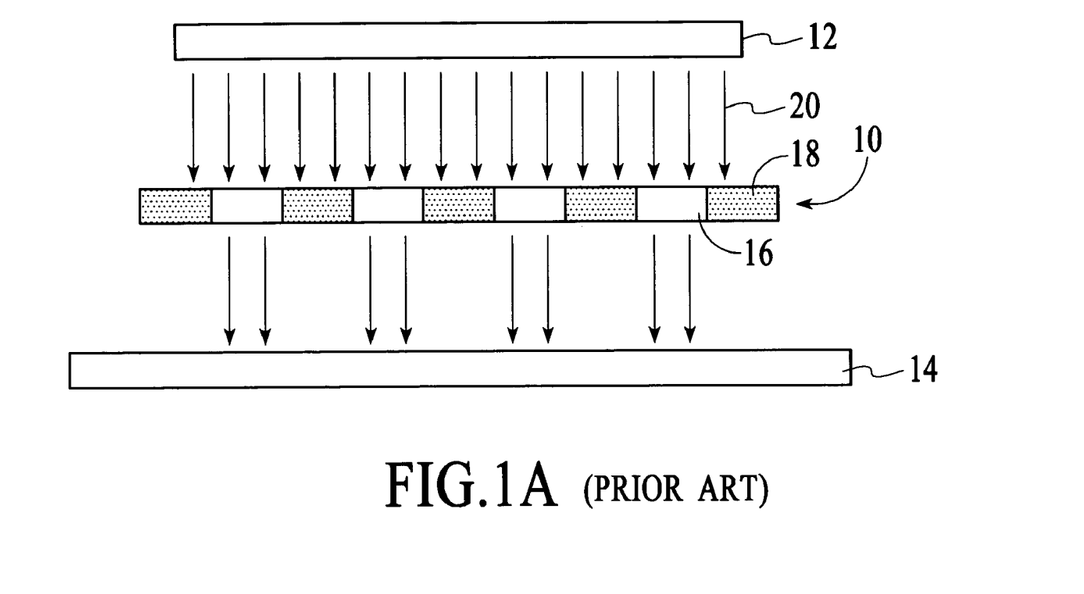
FIG. 1A depicts an example transmissive optical encoding system that includes a codewheel, a light source, and a photodetector as is known in the prior art.

FIG. 1A depicts an example optical encoding system that includes a codewheel 10, a light source 12, and a photodetector array 14. The codewheel has a pattern of transparent and opaque sections 16 and 18 that alternatively pass and block light 20 from the light source. The optical encoding system is configured such that light passes through the transparent sections of the codewheel and is detected by the photodetector array that is located on the other side of the codewheel. Because light passes through the transparent sections of the codewheel, this type of optical encoding system is referred to as a "transmissive" optical encoding system. Transmissive optical encoders are able to generate output signals with good contrast between light and dark and as a result are able to operate at high speeds with relatively high resolution. Although transmissive optical encoding systems provide high quality outputs, the transmissive configuration requires that the light source and photodetector array be located on opposite sides of the codewheel, thereby putting limitations on the profile dimension of the encoding system.

Figure 1B:
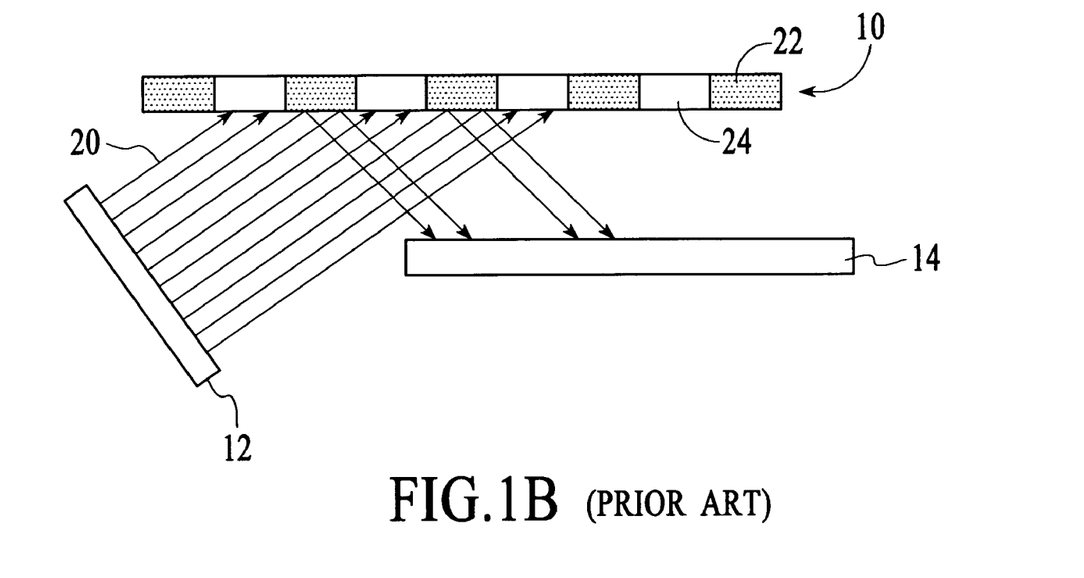
FIG. 1B depicts an example reflective optical encoding system that includes a codewheel with a pattern of reflective and non-reflective sections that alternatively reflect and absorb light from a light source as is known in the prior art.

Optical encoding systems that utilize reflection instead of transmission also exist and are referred to as "reflective" optical encoding systems. FIG. 1B depicts an example reflective optical encoding system that includes a codewheel 10 with a pattern of reflective and non-reflective sections 22 and 24 that alternatively reflect and absorb (or diffuse or pass etc.) light from a light source 12. The reflected light is then detected by a photodetector array 14. Because portions of the codewheel are reflective, the light source and photodetector array can be located on the same side of the codewheel, thereby allowing for a compact profile dimension. Although reflective optical encoding systems are conducive to a compact profile, they suffer from relatively low signal contrast, which restricts the speed and resolution of these encoding systems.

SUMMARY OF THE INVENTION

A coding element such as a codewheel includes first and second surfaces that are configured with respect to each other and with respect to a light beam such that the light beam is reflected at the two surfaces using the optical phenomenon of total internal reflection. The coding element also includes a coding pattern that is aligned in an optical path of the light beam after the light beam has reflected off of both of the surfaces. In an embodiment, the coding element is a transparent ring structure that has inner and outer surfaces that work in conjunction with each other to reflect light to the coding pattern.

A coding element with surfaces that reflect a light beam as a result of total internal reflection can be utilized in an encoding system that operates in transmission while the light source and the photodetector array are located on the same side of the coding element. Operating an optical encoding system in transmission produces output signals with good contrast between light and dark while locating the light source and the photodetector array on the same side of the coding element allows the encoding system to have a smaller profile dimension than traditional transmissive encoding systems.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description similar reference numbers may be used to identify similar elements.

DETAILED DESCRIPTION

Figure 2:
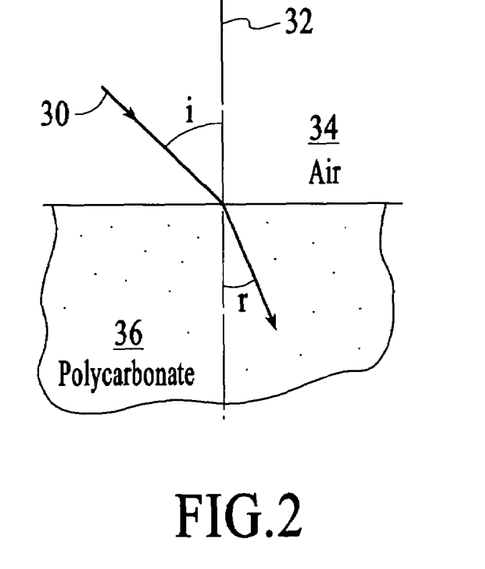
FIG. 2 depicts the refraction of light towards the normal plane of an intercept point when light travels from a low-density medium to a high-density medium.

Total internal reflection (TIR) is a special phenomenon in optical refraction. When light travels from a low-density medium to a high-density medium, for example, from air to polycarbonate, it will refract towards the normal plane of the intercept point. FIG. 2 depicts the refraction of light 30 towards the normal plane 32 of the intercept point when light travels from a low-density medium 34 (e.g., air, with a refractive index of 1) to a high-density medium 36 (e.g., polycarbonate, with a refractive index of n). In FIG. 2, the light travels in air at an angle, i, relative to normal and then travels in the polycarbonate at an angle, r, relative to normal. The relation of the two angles, i and r, is governed by Snell's law as:

$$\frac{\sin i}{\sin r} = n$$

Figure 3:
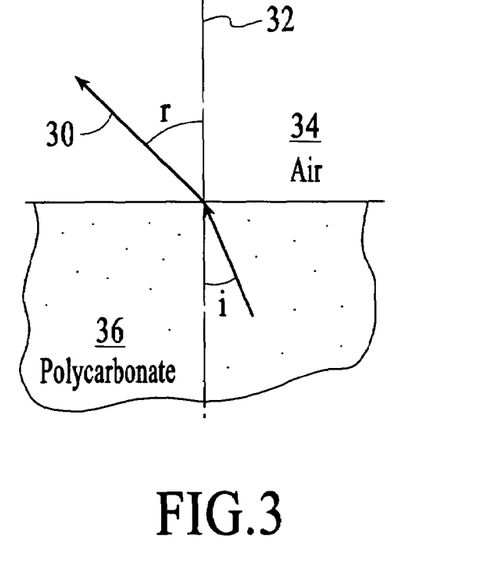
FIG. 3 depicts the refraction of light away from the normal plane as light exits polycarbonate into air.

When light travels instead from a high-density medium 36 (e.g., polycarbonate) to a low-density medium 34 (e.g., air), the light 30 refracts away from the normal plane. FIG. 3 depicts the refraction of light away from the normal plane as light exits polycarbonate into air. Here, Snell's law is presented as:

$$\frac{\sin i}{\sin r} = \frac{1}{n}$$

Figure 4:
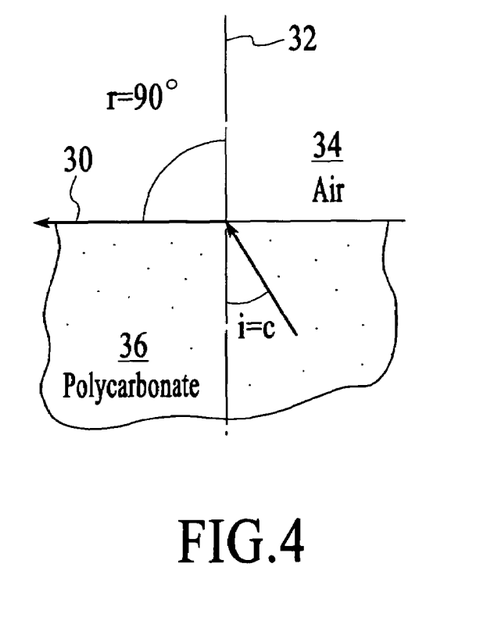
FIG. 4 depicts the refraction of light from polycarbonate to air at the critical angle, c.

In this case, note that r>i, and r increases as i increases. At some point the increase in the angle of incidence, i, will make the angle of refraction equal to 90 degrees (r=90 degrees). The angle of incidence that causes 90 degree refraction is referred to as the "critical angle," c. FIG. 4 depicts the refraction of light from polycarbonate to air at the critical angle, c. In this case, Snell's law is presented as:

$$\frac{\sin c}{\sin 90} = \sin c = \frac{1}{n}$$

Figure 5:
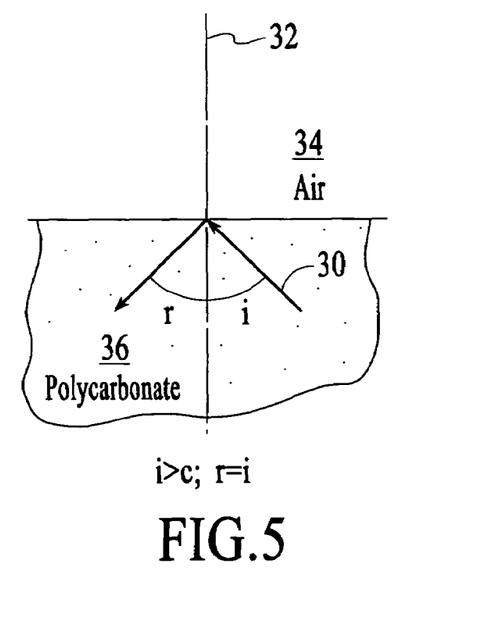
FIG. 5 depicts the reflection of light when the critical angle, c, of the high-density medium is exceeded.

If the angle of incidence is greater than the critical angle, i>c, then total internal reflection occurs and the incident light 30 is totally reflected back within the polycarbonate 36 instead of being refracted into air 34. FIG. 5 depicts the reflection of light when the critical angle, c, of the high-density medium is exceeded. The critical angle for a transparent material such as polycarbonate is approximately 41 degrees (c≈41 degrees). Another characteristic of total internal reflection is that the angle of reflection of the light at the surface is the same as the angle of incidence of the light. Given this relationship, i=r as shown in FIG. 5.

Figure 6:
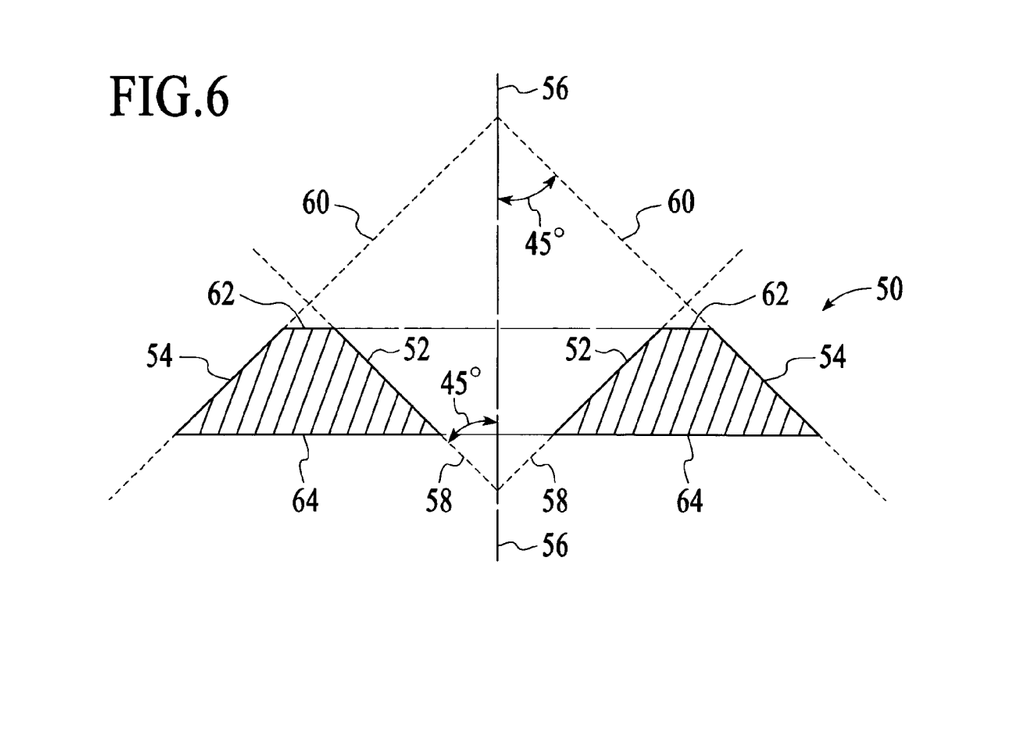
FIG. 6 depicts an example of a transparent ring structure that takes advantage of the total internal reflection phenomena in accordance with the invention.

In accordance with an embodiment of the invention, a coding element such as a codewheel is configured to take advantage of the total internal reflection phenomenon. FIG. 6 depicts an example of a transparent ring structure 50, which forms a portion of a codewheel that takes advantage of the total internal reflection phenomena. The transparent ring structure has inner and outer TIR surfaces 52 and 54 that work in conjunction with each other to reflect light in a way that is conducive to optical encoding. In particular, the inner TIR surface 52 is formed at a first angle relative to the center axis 56 of the transparent ring structure. The angle of the inner TIR surface is referred to as a cone angle because a continuation of the lines 58 of the inner TIR surface intersect to form a cone (referred to herein as the "inner cone"). In the example of FIG. 6, the cone angle of the inner cone is 45 degrees relative to the center axis of the transparent ring structure. The outer TIR surface 54 is formed at a second angle relative to the center axis 56 of the transparent ring structure. A continuation of the lines 60 of the outer TIR surface also intersect to form a cone (referred to herein as the "outer cone"). In the example of FIG. 6, the cone angle of the outer cone is also 45 degrees relative to the center axis 56 of the transparent ring structure. As shown in FIG. 6, the inner and outer cones, which are formed by continuing the lines of the inner and outer TIR surfaces, are inverted relative to each other. As will be described in more detail below, the angles of the inner and outer TIR surfaces are selected such that the surfaces reflect a light beam that is part of an optical encoding system. For example, the critical angle for polycarbonate is approximately 41 degrees and therefore the angles of the inner and outer TIR surfaces must be equal to at least 41 degrees relative to the path of an incident light beam. In addition to being reflective, the angles of the TIR surfaces are chosen to reflect a light beam at angles that are conducive to use in an optical encoding system.

The transparent ring structure 50 depicted in FIG. 6 also includes a top surface 62 and a bottom surface 64. In the example, the top and bottom surfaces are perpendicular to the center axis 56 (i.e., the vertical axis) of the codewheel.

Figure 7:
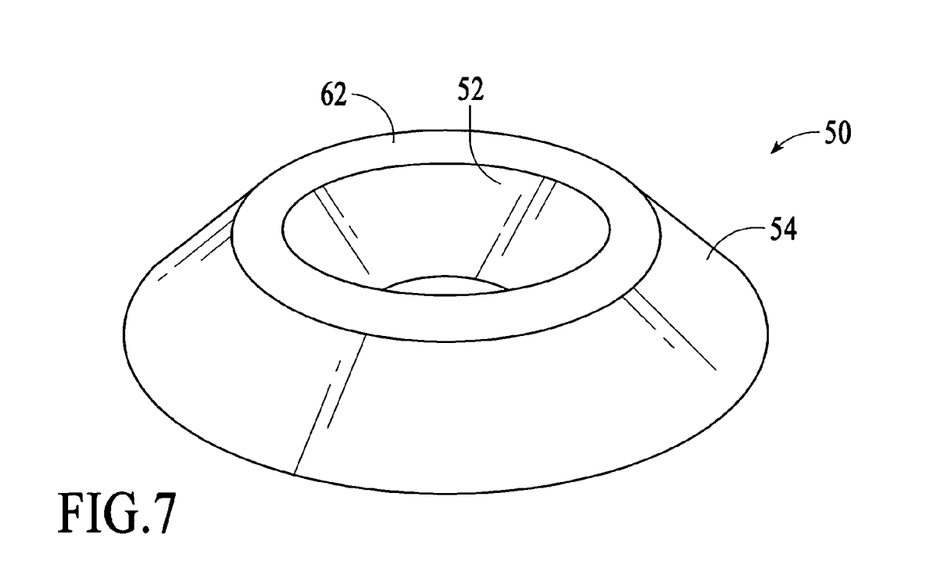
FIG. 7 is an isometric view of the transparent ring structure from FIG. 6.

FIG. 7 is an isometric view of the transparent ring structure 50 from FIG. 6. The isometric view shows the inner and outer TIR surfaces 52 and 54 as described with reference to FIG. 6. In the examples of FIGS. 6 and 7, the transparent ring structure is a monolithic structure that is made of a transparent material such as plastic or glass. Examples of transparent plastic materials include polycarbonate, acrylic, and cyclic olefin copolymer (COC).

Figure 8:
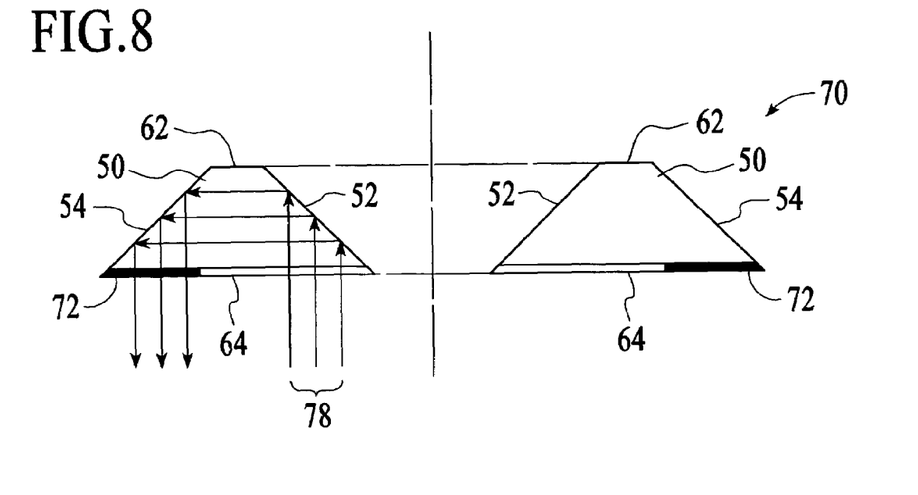
FIG. 8 depicts a codewheel that includes a transparent ring structure as described with reference to FIGS. 6 and 7 and a coding pattern.

A codewheel requires a coding pattern to modulate a light beam. FIG. 8 depicts a codewheel 70 that includes a transparent ring structure 50 as described with reference to FIGS. 6 and 7 and a coding pattern 72. In the example of FIG. 8, the coding pattern is located at the bottom surface 64 of the transparent ring structure. The coding pattern includes alternating transparent and opaque sections that are located around the outer edge of the bottom surface. The coding pattern can be produced using many different techniques and the particular technique implemented is not critical to the invention. In one embodiment, the coding pattern is direct molded onto the transparent ring structure. In another embodiment, a thin profile codewheel with an existing coding pattern is attached (e.g., by adhesive) to the bottom surface of the transparent ring structure.

Figure 9:
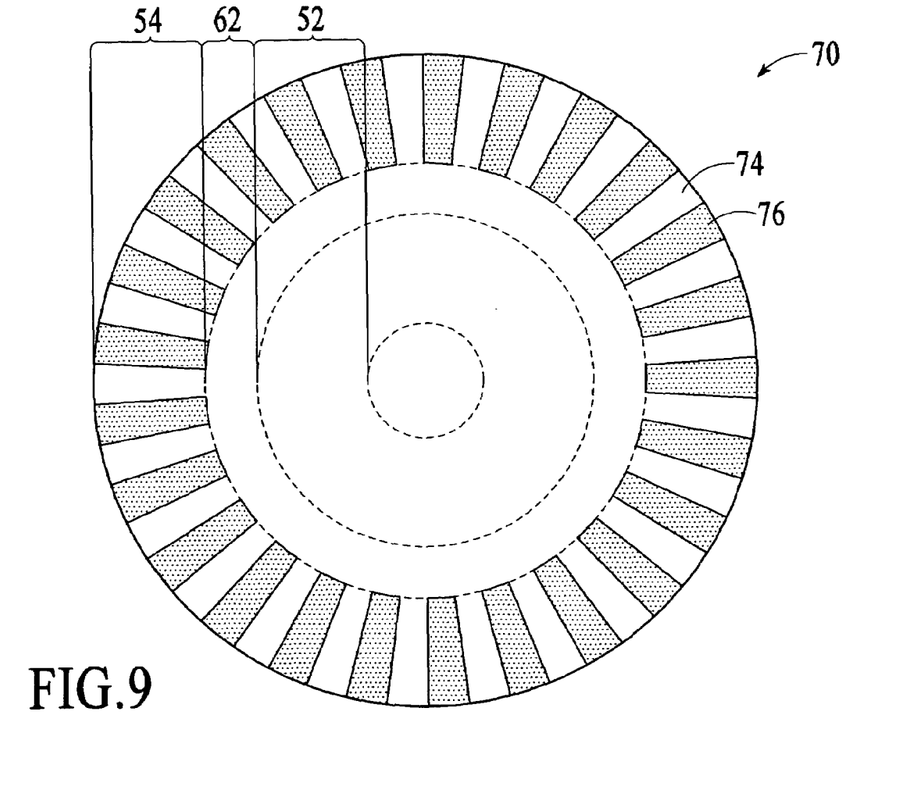
FIG. 9 depicts a bottom view of the codewheel of FIG. 8, which shows the alternating pattern of transparent and opaque sections relative to inner and outer total internal reflection surfaces.

FIG. 9 depicts a bottom view of the codewheel of FIG. 8. The bottom view shows the alternating pattern of transparent and opaque sections 74 and 76 relative to inner and outer TIR surfaces. As depicted in FIGS. 8 and 9, the coding pattern does not cover the entire bottom surface of the transparent ring structure. That is, the coding pattern is located around the outer edge of the bottom surface leaving some portions of the bottom surface of the transparent ring structure without the coding pattern. Specifically, the coding pattern 72 is horizontally aligned with the outer TIR surface 54. That is, the coding pattern is aligned such that light reflected by the outer TIR surface is incident on the coding pattern. In an alternative embodiment, the coding pattern could be horizontally aligned with the inner TIR surface 52 instead of the outer TIR surface. Additionally, in the example of FIG. 9, the coding pattern extends all the way around the codewheel although in other embodiments the coding pattern does not extend all the way around the codewheel. For example, a small section of a coding pattern could be used to index the rotation of a codewheel.

Referring back to FIG. 8, an example light path 78 through the codewheel 70 is shown relative to the inner and outer TIR surfaces 52 and 54 and the coding pattern 72. The example light path enters the bottom of the transparent ring structure on a path that is horizontally aligned with the inner TIR surface and at 90 degrees relative to the plane of the bottom surface 64. Upon entering the transparent ring structure, the light path is incident on the inner TIR surface at a 45 degree angle. Because the light path intersects the inner TIR surface at a 45 degree angle (i.e., an angle that exceeds the critical angle), total internal reflection causes the light to be reflected. The total angle of reflection of the light path is twice the angle of incidence, which in the example of FIG. 8 equals 90 degrees. The outer TIR surface is aligned along the path of the light that is reflected by the inner TIR surface. The light path intersects the outer TIR surface at a 45 degree angle relative to the outer TIR surface and total internal reflection causes the light to be reflected at the same angle. Again the angle of incidence is 45 degrees relative to the outer TIR surface and the total angle of reflection equals 90 degrees. The net result of the two reflections is that the light path exiting the transparent ring structure runs parallel to and in the opposite direction of the light path that enters the transparent ring structure.

Figure 10:
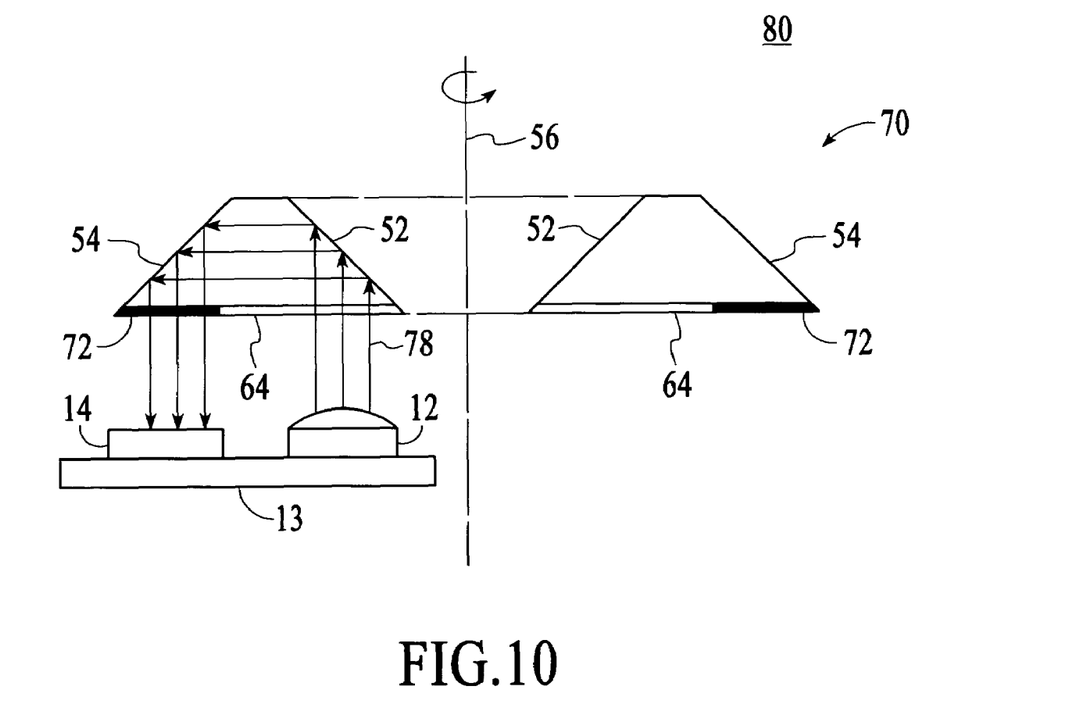
FIG. 10 depicts a coding system in accordance with an embodiment of the invention that includes a light source, a photodetector array, and a codewheel that is similar to the codewheel described with reference to FIGS. 6–9.

The coding element of FIG. 8 can be utilized in a coding system that operates in transmission while the light source and the photodetector array are located on the same side of the coding element. FIG. 10 depicts a coding system 80 that includes a light source 12, a photodetector array 14, and a codewheel 70 that is similar to the codewheel described with reference to FIGS. 6–9. As shown in FIG. 10, light 78 passes through transparent sections of the codewheel's coding pattern while the light source and photodetector array are located on the same side of the codewheel. In the embodiment of FIG. 10, the light source and photodetector array are formed on the same substrate 13. In operation, the codewheel rotates around its center axis 56 while a light beam is output from the light source. The light beam, for example, a collimated light beam, enters the codewheel at the bottom surface 64 and is horizontally aligned with the inner TIR surface 52. In this example, the light beam travels parallel to the center axis of the codewheel and at a 45 degree angle relative to the inner TIR surface. Upon reaching the inner TIR surface, the light beam is reflected (due to the total internal reflection phenomenon) towards the outer TIR surface 54. In particular, the light beam is reflected at 90 degrees relative to the light beam's original path. Upon reaching the outer TIR surface, the light beam is reflected (due to the total internal reflection phenomena) towards the bottom surface of the codewheel and the coding pattern 72. In particular, the light beam is reflected at 90 degrees relative to the light beam's original path. Depending on the location of the transparent and opaque sections of the coding pattern, the reflected light passes through a transparent section of the coding pattern or is blocked by an opaque section of the coding pattern. Light that passes through the coding pattern is detected by the photodetector array 14. The output signals from the photodetector array are processed to produce a digital waveform. The digital waveform is used to provide information about position, velocity, and/or acceleration related to the codewheel. For a more complete description of the operation of optical encoding systems see U.S. Pat. Nos. 4,451,731, 4,691,101, and 5,241,172, which are incorporated by reference herein.

Although the optical encoding system described in the example of FIG. 10 has a light beam entering the codewheel below the inner TIR surface and exiting the codewheel below the outer TIR surface, the configuration could be reversed, including having the coding pattern aligned with the inner TIR surface and the light beam entering the codewheel from below the outer TIR surface.

Figure 11A:
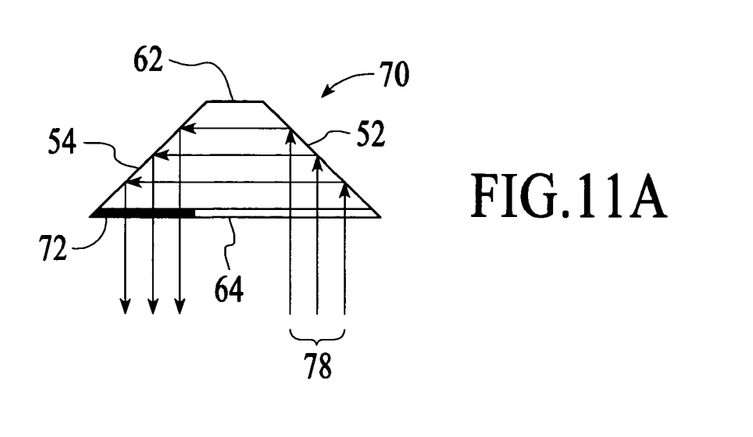
FIG. 11A depicts a cross-sectional view of a linear coding element 70 that has a trapezoidal cross-section.
Figure 11B:
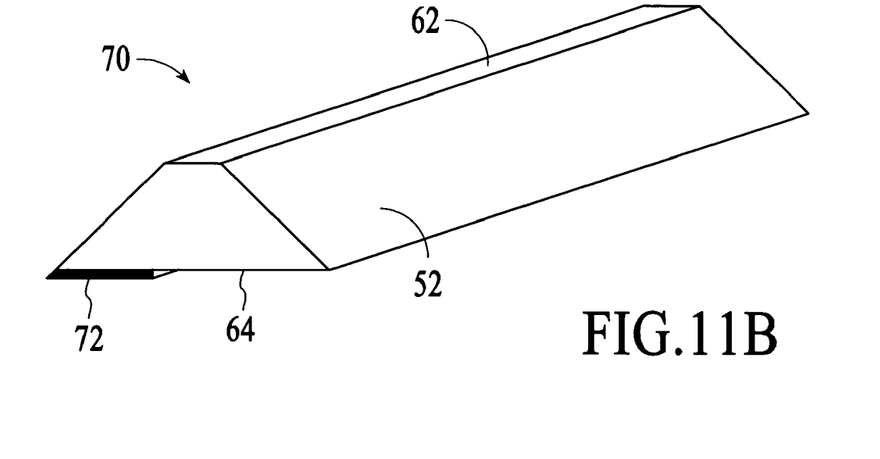
FIG. 11B depicts an isometric view of the linear coding element from FIG. 11A.
Figure 11C:
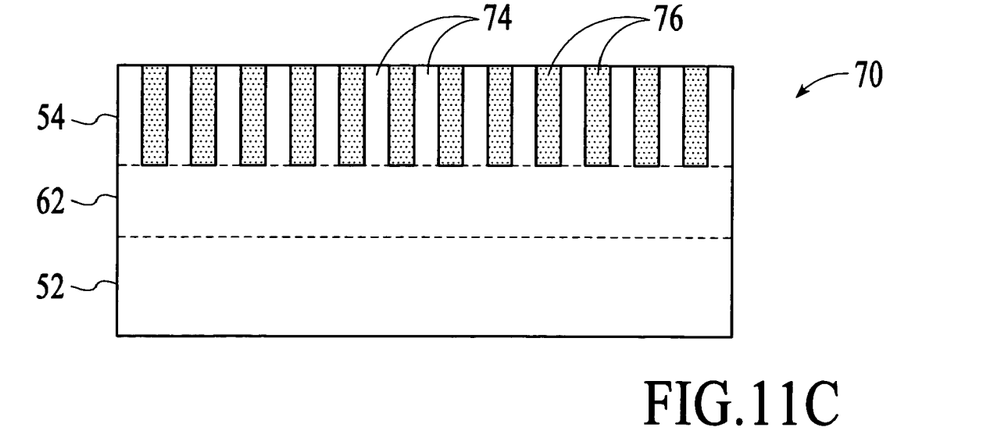
FIG. 11C depicts a bottom view of the linear coding element depicted in FIGS. 11A and 11B.

Optical encoding can be accomplished with coding elements having geometries other than circular. For example, the same total internal reflection principles can be applied to a linear coding element. For example, FIG. 11A depicts a cross-sectional view of a linear coding element 70 that has a trapezoidal cross-section. FIG. 11B depicts an isometric view of the linear coding element from FIG. 11A. FIG. 11C depicts a bottom view of the linear coding element depicted in FIGS. 11A and 11B. The bottom view also depicts the transparent and opaque sections 74 and 76 of the coding pattern 72.

Although the TIR surfaces are angled at 45 degrees, it should be understood that a tolerance of approximately plus or minus 2 degrees may be acceptable in this application. Additionally, other implementations may use TIR surfaces with other angles relative to the light path of the incident light.

Although the coding pattern is described as being integrated with or attached to the transparent ring structure, this is not necessarily required. For example, the coding pattern can be oriented with respect to the transparent ring structure to receive the light beam after it has been reflected through the transparent ring structure.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A coding element comprising:
    a transparent structure having:
        a first total internal reflection (TIR) surface for reflecting a light beam;
        a second TIR surface oriented with respect to the first TIR surface to receive the light beam that is reflected from the first TIR surface and to reflect the light beam; and
    a coding pattern aligned in an optical path of the light beam after the light beam is reflected from both the first and second TIR surfaces;
    wherein the coding pattern is attached to the transparent structure.

2. The coding element of claim 1 wherein both the first and second TIR surfaces are angled at 45 degrees relative to the same axis.

3. The coding element of claim 1 wherein both the first and second TIR surfaces are angled at 45 degrees relative to an axis which is parallel to the path of the light beam before the light beam reaches the first TIR surface.

4. The coding element of claim 1 wherein the transparent structure is a ring structure.

5. The coding element of claim 1 wherein the transparent structure is a trapezoidal structure.

6. The coding element of claim 1 wherein the transparent structure is formed from transparent plastic.

7. The coding element of claim 1 wherein the coding pattern is molded on the transparent structure.

8. A codewheel comprising:
    a transparent ring structure having inner and outer total internal reflection (TIR) surfaces for reflecting a light beam, wherein the inner and outer TIR surfaces are oriented with respect to each other such that the light beam is reflected from one of the TIR surfaces to the other TIR surface; and a coding pattern aligned in an optical path of the light beam after the light beam is reflected from both the inner and outer TIR surfaces.

9. The codewheel of claim 8 wherein the inner and outer TIR surfaces are angled at cone angels, wherein cones formed by the cone angles are inverted with respect to each other.

10. The codewheel of claim 9 wherein the cone angles are 45 degrees relative to the center axis of the transparent ring structure.

11. The codewheel of claim 8 wherein both the inner and outer TIR surfaces are angled at 45 degrees relative to the center axis of the transparent ring structure.

12. The codewheel of claim 8 wherein both the inner and outer TIR surfaces are angled at 45 degrees relative to an axis which is parallel to the path of the light beam before the light beam first reaches one of the inner or outer TIR surfaces.

13. The codewheel of claim 8 wherein the coding pattern is molded on the transparent structure.

14. The codewheel of claim 8 wherein the coding pattern is attached to the transparent structure.

15. An optical encoding system comprising:
  a coding element having a transparent structure and a coding pattern;
  the transparent structure having:
    a first total internal reflection (TIR) surface for reflecting a light beam;
    a second TIR surface oriented with respect to the first TIR surface to receive the light beam that is reflected from the first TIR surface and to reflect the light beam;
  the coding pattern being aligned in an optical path of the light beam after the light beam is reflected off of both the first and second TRI surfaces, wherein the coding pattern is molded on the transparent structure;
  a light source configured with respect to the coding element to direct a light beam towards the first TIR surface of the coding element; and
  a photodetector array configured with respect to the coding element to detect the light beam from the light source after the light beam has reflected off of both the first and second TIR surfaces and passed through the coding pattern.

16. The optical encoding system of claim 15 wherein the light source outputs a collimated light beam.

17. The optical encoding system of claim 15 wherein both the first and second TIR surfaces are angled at 45 degrees relative to an axis which is parallel to the path of the light beam before the light beam reaches the first TIR surface.

18. The optical encoding system of claim 15 wherein the transparent structure is a ring structure.

19. The optical encoding system of claim 15 wherein the transparent structure is a trapezoidal structure.

* * * * *

UNITED STATES PATENT AND TRADEMARK OFFICE
CERTIFICATE OF CORRECTION

PATENT NO.        : 7,145,127 B2
APPLICATION NO.   : 10/926243
DATED             : December 5, 2006
INVENTOR(S)       : Yee Loong Chin et al.

It is certified that error appears in the above-identified patent and that said Letters Patent is hereby corrected as shown below:

Column 8, Line 7, Claim 15, delete "TRI" and insert -- TIR --.

Signed and Sealed this

First Day of June, 2010

David J. Kappos
*Director of the United States Patent and Trademark Office*